United States Patent
Ye et al.

(10) Patent No.: US 10,739,928 B1
(45) Date of Patent: Aug. 11, 2020

(54) TOUCH SUBSTRATE AND DISPLAY DEVICE

(71) Applicant: WUHAN CHINA STAR OPTOELECTRONICS SEMICONDUCTOR DISPLAY TECHNOLOGY CO., LTD., Wuhan, Hubei (CN)

(72) Inventors: Jian Ye, Hubei (CN); Qibing Dai, Hubei (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 16/477,890

(22) PCT Filed: Apr. 16, 2019

(86) PCT No.: PCT/CN2019/082822
§ 371 (c)(1),
(2) Date: Jul. 14, 2019

(30) Foreign Application Priority Data

Feb. 28, 2019 (CN) .......................... 2019 1 0149810

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0445* (2019.05); *G06F 3/0446* (2019.05)

(58) Field of Classification Search
CPC .... G06F 3/0448; G06F 3/0412; G06F 3/0445; G06F 3/0446
See application file for complete search history.

(56) References Cited

U.S. PATENT DOCUMENTS

| | | | | |
|---|---|---|---|---|
| 2015/0253912 | A1* | 9/2015 | Liu | G06F 3/0412 345/174 |
| 2019/0050076 | A1* | 2/2019 | Zhang | G06F 3/044 |
| 2019/0187846 | A1* | 6/2019 | Du | G06F 3/0446 |
| 2019/0220123 | A1* | 7/2019 | Kanaya | G06F 3/0443 |
| 2019/0310727 | A1* | 10/2019 | Xie | G06F 3/0443 |
| 2019/0361556 | A1* | 11/2019 | Wang | G06F 3/047 |
| 2020/0073496 | A1* | 3/2020 | Cai | G06F 3/0412 |

FOREIGN PATENT DOCUMENTS

| | | | | |
|---|---|---|---|---|
| CN | 109343744 A | * | 2/2019 | .......... G06F 3/0412 |
| WO | WO-2019029376 A1 | * | 2/2019 | .......... G06F 3/0412 |

* cited by examiner

*Primary Examiner* — Abhishek Sarma
(74) *Attorney, Agent, or Firm* — Mark M. Friedman (57) ABSTRACT

The present disclosure provides a touch substrate and a display device. Shapes of the inside of electrode patterns are formed to be in consistency with shapes of the outer peripheries of the electrode patterns, therefore difference of light reflectance between the trenches surrounding the electrode patterns and the inside of the electrode patterns is reduced. Accordingly, the likelihood that the electrode patterns are visually noticeable is lowered, thus raising the visual effects displayed by the display devices.

17 Claims, 5 Drawing Sheets

TOUCH SUBSTRATE AND DISPLAY DEVICE

FIELD OF INVENTION

The present disclosure relates to a field of display technology, and more particularly to a touch substrate and a display device.

BACKGROUND

Currently, all out-cell touch substrates, used for a flexible active matrix organic light emitting diode (AMOLED) display screen, are of a film type, where touch sensors are generally made of transparent conductive metal oxide, i.e., indium tin oxide (ITO). The out-cell touch substrates are disposed on the flexible AMOLED display screen, and an ITO electrode pattern is formed by photolithography and etching techniques. The photolithography and etching techniques are used to remove a portion of the ITO conductive material in some regions, so as to form touch driving electrodes and touch sensing electrodes that are electrically independent from each other.

Patterns of conventional touch electrodes, regardless of either mutual-capacitive touch sensors or self-capacitive touch sensors, all have a regular shape, e.g., a square shape, a diamond shape, etc.

However, because of difference of optical properties, such as light reflectance between etched regions and non-etched regions, the formed ITO electrode pattern is visually noticeable. This affects entire visual effects displayed by the display screens.

SUMMARY OF DISCLOSURE

The present disclosure provides a touch substrate and a display device, which lowers the likelihood that the electrode patterns are visually noticeable.

The present disclosure provides a touch substrate, comprising: a first driving electrode pattern, a second driving electrode pattern, a first sensing electrode pattern, a second sensing electrode pattern, a first insulation trench, a second insulation trench, a third insulation trench, and a fourth insulation trench;

wherein the first sensing electrode pattern and the second sensing electrode pattern are connected to each other via a connection portion, and the first driving electrode pattern and the second driving electrode pattern are disposed at two sides of the connection portion;

wherein the first insulation trench is connected to the second insulation trench, such that the first driving electrode pattern is separated from the first sensing electrode pattern and the second sensing electrode pattern;

wherein the third insulation trench is connected to the fourth insulation trench, such that the second driving electrode pattern is separated from the first sensing electrode pattern and the second sensing electrode pattern;

wherein the first insulation trench comprises a plurality of trenches having a first slope and a plurality of trenches having a second slope;

wherein the second insulation trench comprises a plurality of trenches having a third slope and a plurality of trenches having a fourth slope;

wherein the third insulation trench comprises a plurality of trenches having a fifth slope and a plurality of trenches having a sixth slope;

wherein the fourth insulation trench comprises a plurality of trenches having a seventh slope and a plurality of trenches having an eighth slope.

In the touch substrate provided by one embodiment of the present disclosure, the trenches having the first slope and the trenches having the second slope are connected to each other alternately;

the trenches having the third slope and the trenches having the fourth slope are connected to each other alternately;

the trenches having the fifth slope and the trenches having the sixth slope are connected to each other alternately;

the trenches having the seventh slope and the trenches having the eighth slope are connected to each other alternately.

In the touch substrate provided by one embodiment of the present disclosure, the first insulation trench is symmetrical to the second insulation trench with respect to a Y-axis:

the third insulation trench is symmetrical to the fourth insulation trench with respect to the Y-axis.

In the touch substrate provided by one embodiment of the present disclosure.

the first driving electrode pattern comprises a first sub-driving electrode pattern and a second sub-driving electrode pattern;

the first sub-driving electrode pattern comprises a plurality of first driving electrode lines and a plurality of second driving electrode lines;

each of the first driving electrode lines comprises a plurality of electrode lines having the first slope and a plurality of electrode lines having the second slope, and the electrode lines having the first slope and the electrode lines having the second slope are connected to each other alternately;

each of the second driving electrode lines comprises a plurality of electrode lines having the third slope and a plurality of electrode lines having the fourth slope, and the electrode lines having the third slope and the electrode lines having the fourth slope are connected to each other alternately;

the first driving electrode lines and the second driving electrode lines cross each other;

the second sub-driving electrode pattern and the first sub-driving electrode pattern are axisymmetrical to each other.

In the touch substrate provided by one embodiment of the present disclosure.

the second driving electrode pattern comprises a third sub-driving electrode pattern and a fourth sub-driving electrode pattern:

the third sub-driving electrode pattern comprises a plurality of third driving electrode lines and a plurality of fourth driving electrode lines;

each of the third driving electrode lines comprises a plurality of electrode lines having the fifth slope and a plurality of electrode lines having the sixth slope, and the electrode lines having the fifth slope and the electrode lines having the sixth slope are connected to each other alternately;

each of the fourth driving electrode lines comprises a plurality of electrode lines having the seventh slope and a plurality of electrode lines having the eighth slope, and the electrode lines having the seventh slope and the electrode lines having the eighth slope are connected to each other alternately;

the third driving electrode lines and the fourth driving electrode lines cross each other:

the fourth sub-driving electrode pattern and the third sub-driving electrode pattern are axisymmetrical to each other.

In the touch substrate provided by one embodiment of the present disclosure, the first sensing electrode pattern comprises a first sub-sensing electrode pattern and a second sub-sensing electrode pattern;

the first sub-sensing electrode pattern comprises a plurality of first sensing electrode lines and a plurality of second sensing electrode lines:

each of the first sensing electrode lines comprises a plurality of electrode lines having the first slope and a plurality of electrode lines having the second slope, and the electrode lines having the first slope and the electrode lines having the second slope are connected to each other alternately:

each of the second sensing electrode lines comprises a plurality of electrode lines having the seventh slope and a plurality of electrode lines having the eighth slope, and the electrode lines having the seventh slope and the electrode lines having the eighth slope are connected to each other alternately;

the first sensing electrode lines and the second sensing electrode lines cross each other;

the second sub-sensing electrode pattern and the first sub-sensing electrode pattern are axisymmetrical to each other.

In the touch substrate provided by one embodiment of the present disclosure.

the second sensing electrode pattern further comprises a third sub-sensing electrode pattern and a fourth sub-sensing electrode pattern;

the third sub-sensing electrode pattern comprises a plurality of third sensing electrode lines and a plurality of fourth sensing electrode lines;

each of the third sensing electrode lines comprises a plurality of electrode lines having the third slope and a plurality of electrode lines having the fourth slope, and the electrode lines having the third slope and the electrode lines having the fourth slope are connected to each other alternately;

each of the fourth sensing electrode lines comprises a plurality of electrode lines having the fifth slope and a plurality of electrode lines having the sixth slope, and the electrode lines having the fifth slope and the electrode lines having the sixth slope are connected to each other alternately;

the third sensing electrode lines and the fourth sensing electrode lines cross each other:

the fourth sub-sensing electrode pattern and the third sub-sensing electrode pattern are axisymmetrical to each other.

In the touch substrate provided by one embodiment of the present disclosure, the touch substrate further comprises an insulation layer covering the first driving electrode pattern, the second driving electrode pattern, the first sensing electrode pattern, and the second sensing electrode pattern.

In the touch substrate provided by one embodiment of the present disclosure, the touch substrate further comprises a connection bridge disposed on the insulation layer, wherein the connection bridge is disposed between the first driving electrode pattern and the second driving electrode pattern to electrically connect the first driving electrode pattern to the second driving electrode pattern.

In addition, the present disclosure provides a display device, comprising: a first driving electrode pattern, a second driving electrode pattern, a first sensing electrode pattern, a second sensing electrode pattern, a first insulation trench, a second insulation trench, a third insulation trench, and a fourth insulation trench; wherein the first sensing electrode pattern and the second sensing electrode pattern are connected to each other via a connection portion, and the first driving electrode pattern and the second driving electrode pattern are disposed at two sides of the connection portion;

wherein the first insulation trench is connected to the second insulation trench, such that the first driving electrode pattern is separated from the first sensing electrode pattern and the second sensing electrode pattern;

wherein the third insulation trench is connected to the fourth insulation trench, such that the second driving electrode pattern is separated from the first sensing electrode pattern and the second sensing electrode pattern;

wherein the first insulation trench comprises a plurality of trenches having a first slope and a plurality of trenches having a second slope:

wherein the second insulation trench comprises a plurality of trenches having a third slope and a plurality of trenches having a fourth slope;

wherein the third insulation trench comprises a plurality of trenches having a fifth slope and a plurality of trenches having a sixth slope;

wherein the fourth insulation trench comprises a plurality of trenches having a seventh slope and a plurality of trenches having an eighth slope.

In the display device provided by one embodiment of the present disclosure, the trenches having the first slope and the trenches having the second slope are connected to each other alternately;

the trenches having the third slope and the trenches having the fourth slope are connected to each other alternately;

the trenches having the fifth slope and the trenches having the sixth slope are connected to each other alternately;

the trenches having the seventh slope and the trenches having the eighth slope are connected to each other alternately.

In the display device provided by one embodiment of the present disclosure, the first insulation trench is symmetrical to the second insulation trench with respect to a Y-axis;

the third insulation trench is symmetrical to the fourth insulation trench with respect to the Y-axis.

In the display device provided by one embodiment of the present disclosure.

the first driving electrode pattern comprises a first sub-driving electrode pattern and a second sub-driving electrode pattern;

the first sub-driving electrode pattern comprises a plurality of first driving electrode lines and a plurality of second driving electrode lines;

each of the first driving electrode lines comprises a plurality of electrode lines having the first slope and a plurality of electrode lines having the second slope, and the electrode lines having the first slope and the electrode lines having the second slope are connected to each other alternately;

each of the second driving electrode lines comprises a plurality of electrode lines having the third slope and a plurality of electrode lines having the fourth slope, and the electrode lines having the third slope and the electrode lines having the fourth slope are connected to each other alternately;

the first driving electrode lines and the second driving electrode lines cross each other:

the second sub-driving electrode pattern and the first sub-driving electrode pattern are axisymmetrical to each other.

In the display device provided by one embodiment of the present disclosure, the second driving electrode pattern comprises a third sub-driving electrode pattern and a fourth sub-driving electrode pattern;

the third sub-driving electrode pattern comprises a plurality of third driving electrode lines and a plurality of fourth driving electrode lines:

each of the third driving electrode lines comprises a plurality of electrode lines having the fifth slope and a plurality of electrode lines having the sixth slope, and the electrode lines having the fifth slope and the electrode lines having the sixth slope are connected to each other alternately;

each of the fourth driving electrode lines comprises a plurality of electrode lines having the seventh slope and a plurality of electrode lines having the eighth slope, and the electrode lines having the seventh slope and the electrode lines having the eighth slope are connected to each other alternately;

the third driving electrode lines and the fourth driving electrode lines cross each other; the fourth sub-driving electrode pattern and the third sub-driving electrode pattern are axisymmetrical to each other.

In the display device provided by one embodiment of the present disclosure, the second sensing electrode pattern further comprises a third sub-sensing electrode pattern and a fourth sub-sensing electrode pattern;

the third sub-sensing electrode pattern comprises a plurality of third sensing electrode lines and a plurality of fourth sensing electrode lines;

each of the third sensing electrode lines comprises a plurality of electrode lines having the third slope and a plurality of electrode lines having the fourth slope, and the electrode lines having the third slope and the electrode lines having the fourth slope are connected to each other alternately;

each of the fourth sensing electrode lines comprises a plurality of electrode lines having the fifth slope and a plurality of electrode lines having the sixth slope, and the electrode lines having the fifth slope and the electrode lines having the sixth slope are connected to each other alternately;

the third sensing electrode lines and the fourth sensing electrode lines cross each other;

the fourth sub-sensing electrode pattern and the third sub-sensing electrode pattern are axisymmetrical to each other.

In the display device provided by one embodiment of the present disclosure, the display device further comprises an insulation layer covering the first driving electrode pattern, the second driving electrode pattern, the first sensing electrode pattern, and the second sensing electrode pattern.

In the display device provided by one embodiment of the present disclosure, the display device further comprises a connection bridge disposed on the insulation layer, wherein the connection bridge is disposed between the first driving electrode pattern and the second driving electrode pattern to electrically connect the first driving electrode pattern to the second driving electrode pattern.

According to the touch substrate provided by the embodiments of the present disclosure, the shapes of the inside of the electrode patterns are formed to be in consistency with the shapes of the outer peripheries of the electrode patterns, therefore difference of light reflectance between the trenches surrounding the electrode patterns and the inside of the electrode patterns is reduced. Accordingly, the likelihood that the electrode patterns are visually noticeable is lowered, thus raising the visual effects displayed by the display devices.

BRIEF DESCRIPTION OF DRAWINGS

To explain in detail the technical schemes of the embodiments of the present invention, drawings that are used to illustrate the embodiments are provided. Apparently, the illustrated embodiments are just a part of those of the present disclosure. It is easy for any person having ordinary skill in the art to obtain other drawings without labor for inventiveness.

DETAILED DESCRIPTION

The technical solutions in embodiments of the present application will be described clearly and completely below with reference to the accompanying drawings of embodiments of the present application. Obviously, the described embodiments are merely some of the embodiments of the present application, rather than all of the embodiments. All other embodiments obtained based on the embodiments of the present application by those ordinary skills in the art without doing any creative efforts fall in the protection scope defined by the present application.

The present disclosure provides a touch substrate. Detailed description therefor is provided below.

Figure 1:
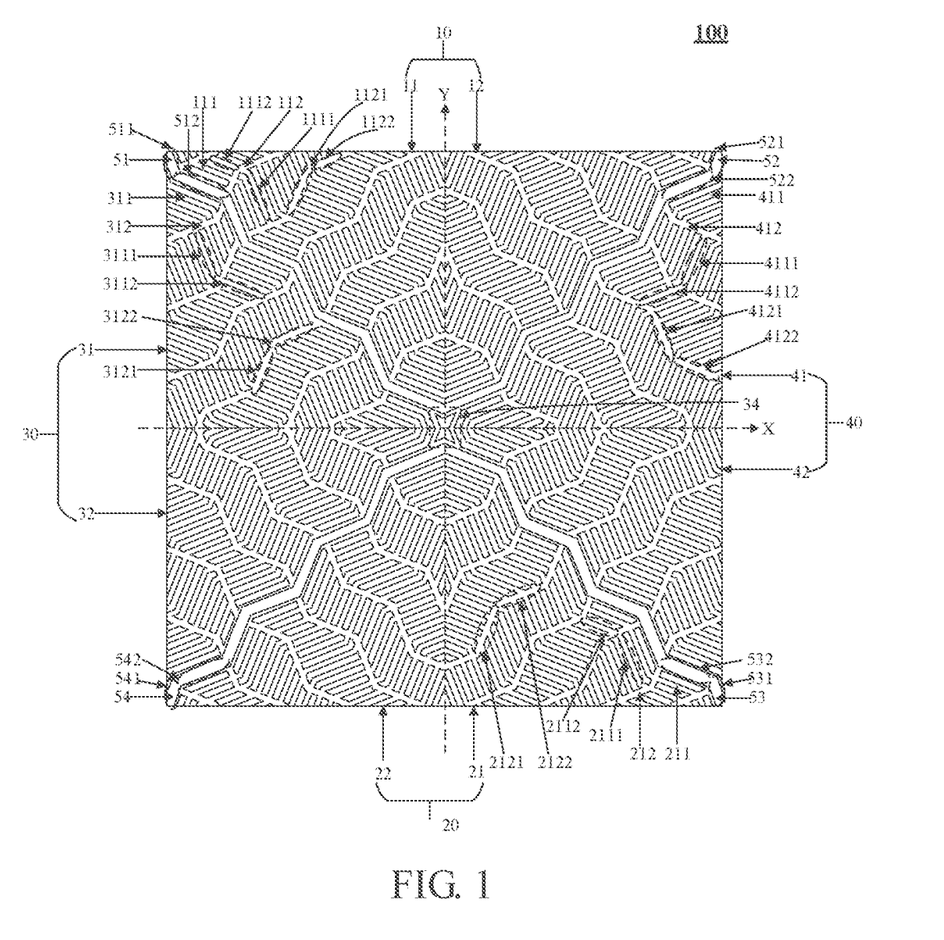
FIG. 1 shows a schematic view of a first structure of a touch substrate according to one embodiment of the present disclosure.

Please refer to FIG. 1. A touch substrate 100 includes a first driving electrode pattern 10, a second driving electrode pattern 20, a first sensing electrode pattern 30, a second sensing electrode pattern 40, a first insulation trench 51, a second insulation trench 52, a third insulation trench 53, and a fourth insulation trench 54.

The first sensing electrode pattern 30 and the second sensing electrode pattern 40 are connected to each other via a connection portion 34. The first driving electrode pattern 10 and the second driving electrode pattern 20 are disposed at two sides of the connection portion 34. As shown, it is understood that the first sensing electrode pattern 30 is disposed at a left side of the Y-axis, and the second sensing electrode pattern 40 is disposed at a right side of the Y-axis.

The first insulation trench 51 is connected to the second insulation trench 52, such that the first driving electrode pattern 10 is separated from the first sensing electrode pattern 30 and the second sensing electrode pattern 40.

The third insulation trench 53 is connected to the fourth insulation trench 54, such that the second driving electrode pattern 20 is separated from the first sensing electrode pattern 30 and the second sensing electrode pattern 40.

The first insulation trench 51 comprises a plurality of trenches 511 having a first slope and a plurality of trenches having a second slope 512. The trenches 511 having the first slope and the trenches 512 having the second slope are connected to each other alternately.

The second insulation trench 52 comprises a plurality of trenches 521 having a third slope and a plurality of trenches 522 having a fourth slope. The trenches 521 having the third slope and the trenches 522 having the fourth slope are connected to each other alternately.

The third insulation trench 53 comprises a plurality of trenches 531 having a fifth slope and a plurality of trenches 532 having a sixth slope. The trenches 531 having the fifth slope and the trenches 532 having the sixth slope are connected to each other alternately.

The fourth insulation trench 54 comprises a plurality of trenches 541 having a seventh slope and a plurality of trenches 542 having an eighth slope. The trenches 541 having the seventh slope and the trenches 542 having the eighth slope are connected to each other alternately.

As shown, it is understood that the first insulation trench 51 is symmetrical to the second insulation trench 52 with respect to the Y-axis, and the third insulation trench 53 is symmetrical to the fourth insulation trench 54 with respect the Y-axis. In addition, the first insulation trench 51 is symmetrical to the fourth insulation trench 54 with respect to the X-axis, and the second insulation trench 52 is symmetrical to the third insulation trench 53 with respect the X-axis. In other words, the slope is equal to the fifth slope, the second slope is equal to the sixth slope, the third slope is equal to the seventh slope, and the fourth slope is equal to the eighth slope.

It is understood that the first insulation trench 51, the second insulation trench 52, the third insulation trench 53, and the fourth insulation trench 54 can be formed by an etching technique.

It is understood that, in description of the present disclosure, terms such as "first" and "second" are used herein for purposes of description and are not intended to indicate or imply relative importance or significance. Thus, the feature defined with "first" and "second" may comprise one or more this feature.

In some embodiments, the first driving electrode pattern 10 comprises a first sub-driving electrode pattern 11 and a second sub-driving electrode pattern 12.

The first sub-driving electrode pattern 11 comprises a plurality of first driving electrode lines 111 and a plurality of second driving electrode lines 112.

Each of the first driving electrode lines 111 comprises a plurality of electrode lines 1111 having the first slope and a plurality of electrode lines 1112 having the second slope, and the electrode lines 1111 having the first slope and the electrode lines 1112 having the second slope are connected to each other alternately.

Each of the second driving electrode lines 112 comprises a plurality of electrode lines 1121 having the third slope and a plurality of electrode lines 1122 having the fourth slope, and the electrode lines 1121 having the third slope and the electrode lines 1122 having the fourth slope are connected to each other alternately.

The first driving electrode lines 111 and the second driving electrode lines 112 cross each other to form a grid pattern.

The second sub-driving electrode pattern 12 is symmetrical to the first sub-driving electrode pattern 11 with respect to the Y-axis.

In some embodiments, the second driving electrode pattern 20 comprises a third sub-driving electrode pattern 21 and a fourth sub-driving electrode pattern 22.

The third sub-driving electrode pattern 21 comprises a plurality of third driving electrode lines 211 and a plurality of fourth driving electrode lines 212.

Each of the third driving electrode lines 211 comprises a plurality of electrode lines 2111 having the fifth slope and a plurality of electrode lines 2112 having the sixth slope, and the electrode lines 2111 having the fifth slope and the electrode lines 2112 having the sixth slope are connected to each other alternately.

Each of the fourth driving electrode lines 212 comprises a plurality of electrode lines 2121 having the seventh slope and a plurality of electrode lines 2122 having the eighth slope, and the electrode lines 2121 having the seventh slope and the electrode lines 2122 having the eighth slope are connected to each other alternately.

The third driving electrode lines 211 and the fourth driving electrode lines 212 cross each other to form a grid pattern.

The fourth sub-driving electrode pattern 22 is symmetrical to the third sub-driving electrode pattern 21 with respect to the Y-axis.

In some embodiments, the first sensing electrode pattern 30 comprises a first sub-sensing electrode pattern 31 and a second sub-sensing electrode pattern 32.

The first sub-sensing electrode pattern 31 comprises a plurality of first sensing electrode lines 311 and a plurality of second sensing electrode lines 312.

Each of the first sensing electrode lines 311 comprises a plurality of electrode lines 3111 having the first slope and a plurality of electrode lines 3112 having the second slope, and the electrode lines 3111 having the first slope and the electrode lines 3112 having the second slope are connected to each other alternately.

Each of the second sensing electrode lines 312 comprises a plurality of electrode lines 3121 having the seventh slope and a plurality of electrode lines 3122 having the eighth slope, and the electrode lines 3121 having the seventh slope and the electrode lines 3122 having the eighth slope are connected to each other alternately.

The first sensing electrode lines 311 and the second sensing electrode lines 312 cross each other to form a grid pattern.

The second sub-sensing electrode pattern 32 is symmetrical to the first sub-sensing electrode pattern 31 with respect to the X-axis.

In some embodiments, the second sensing electrode pattern 40 further comprises a third sub-sensing electrode pattern 41 and a fourth sub-sensing electrode pattern 42.

The third sub-sensing electrode pattern 41 comprises a plurality of third sensing electrode lines 411 and a plurality of fourth sensing electrode lines 412.

Each of the third sensing electrode lines 411 comprises a plurality of electrode lines 4111 having the third slope and a plurality of electrode lines 4112 having the fourth slope, and the electrode lines 4111 having the third slope and the electrode lines 4112 having the fourth slope are connected to each other alternately.

Each of the fourth sensing electrode lines 412 comprises a plurality of electrode lines 4121 having the fifth slope and a plurality of electrode lines 4122 having the sixth slope, and the electrode lines 4121 having the fifth slope and the electrode lines 4122 having the sixth slope are connected to each other alternately.

The third sensing electrode lines 411 and the fourth sensing electrode lines 412 cross each other to form a grid pattern.

The fourth sub-sensing electrode pattern 42 is symmetrical to the third sub-sensing electrode pattern 41 with respect to the X-axis.

It is understood that the electrode lines of the first driving electrode pattern 10, the second driving electrode pattern 20, the first sensing electrode pattern 30, and the second sensing electrode pattern 40 can be formed by the etching technique. Specifically, an etching step is performed for formation of the first driving electrode pattern 10, the second driving electrode pattern 20, the first sensing electrode pattern 30, and the second sensing electrode pattern 40, in order to firstly form a plurality of insulation recesses having predetermined shapes, and thus thereby to form the electrode lines of the first driving electrode pattern 10, the second driving electrode pattern 20, the first sensing electrode pattern 30, and the second sensing electrode pattern 40. Such a structure can ensure that the inside of the electrode patterns have shapes which are in consistency with the shapes of the insulation trenches, thus lowering the likelihood that the electrode patterns are visually noticeable.

Figure 2:
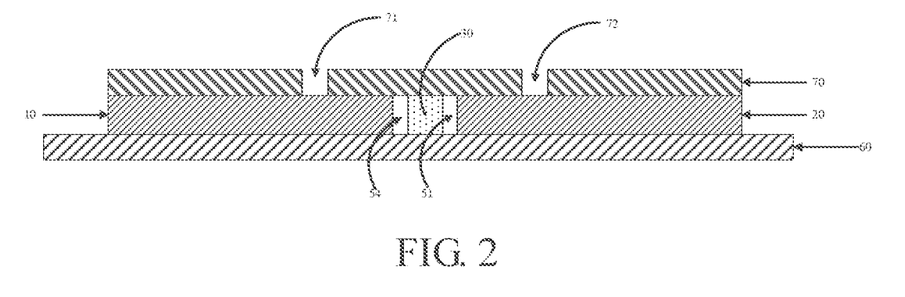
FIG. 2 shows a schematic view of a second structure of a touch substrate according to one embodiment of the present disclosure.

Please refer to FIG. 2, which shows a cross-sectional view of the touch substrate cut along the Y-axis. In some embodiments, the touch substrate 100 can further comprise an insulation layer 70 covering the first driving electrode pattern 10, the second driving electrode pattern 20, the first sensing electrode pattern 30, and the second sensing electrode pattern 40. A first through-hole 71 and a second through-hole 72 are formed in the insulation layer 70. Formation of the first through-hole 71 makes the first driving electrode pattern 10 exposed, and formation of the second through-hole 72 makes the second driving electrode pattern 20 exposed.

Figure 3:
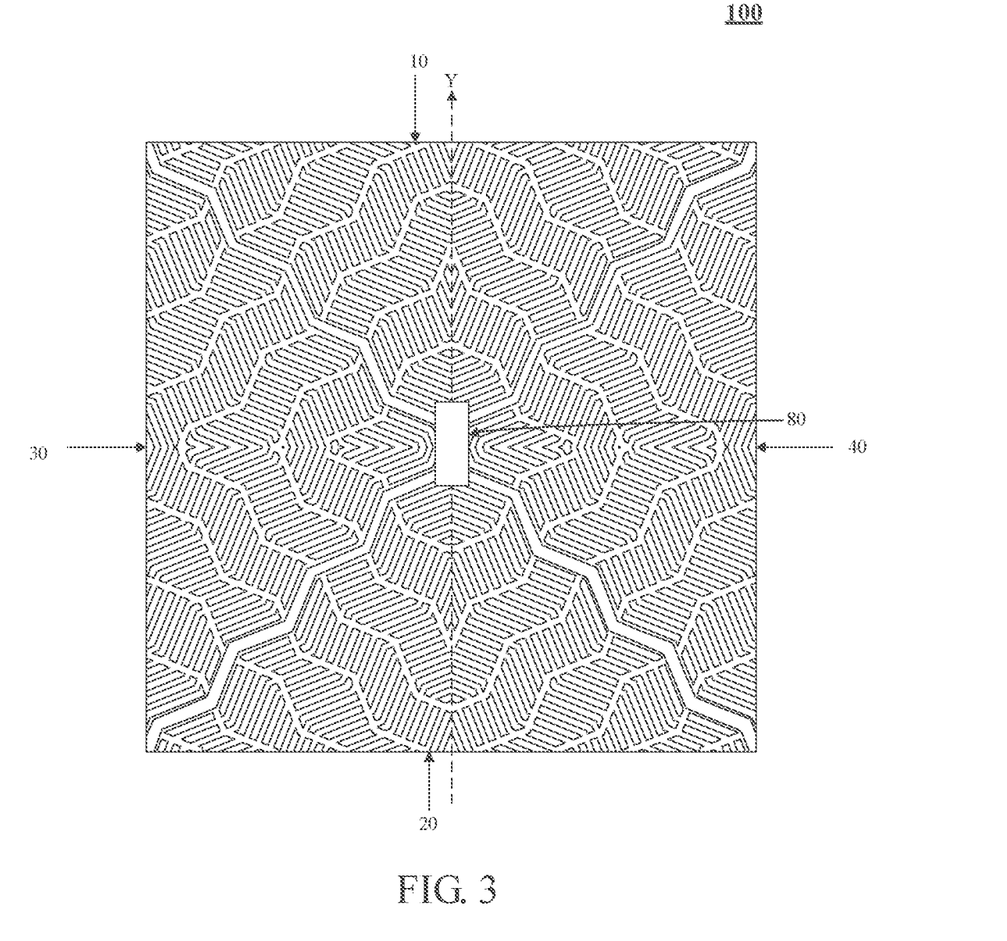
FIG. 3 shows a schematic view of a third structure of a touch substrate according to one embodiment of the present disclosure.

Please refer to FIG. 3. The touch substrate 100 can further comprises a connection bridge 80. The connection bridge 80 is positioned in a center of the touch substrate 100, and crosses over the first sensing electrode pattern 30 and the second sensing electrode pattern 40. The connection bridge 80 is disposed between the first driving electrode pattern 10 and the second driving electrode pattern 20 to electrically connect the first driving electrode pattern 10 to the second driving electrode pattern 20.

Figure 4:
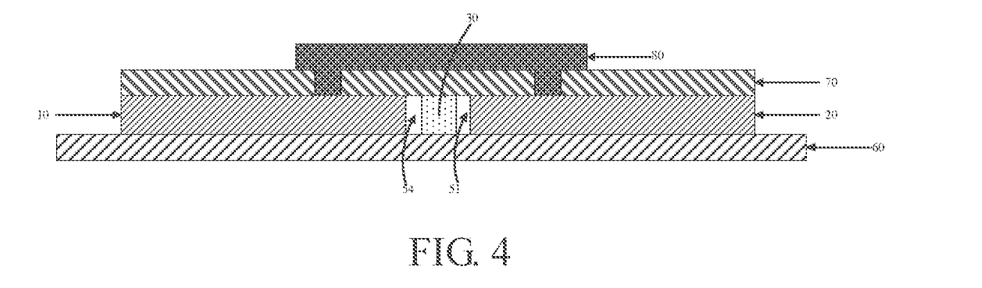
FIG. 4 shows a schematic view of a fourth structure of a touch substrate according to one embodiment of the present disclosure.

The connection bridge 80 is disposed in a way as shown in FIG. 4, where FIG. 4 shows a cross-sectional view of the touch substrate of FIG. 3 cut along the Y-axis. The connection bridge 80 is disposed on the insulation layer 70, and completely fills the first through-hole 71 and the second through-hole 72 in the insulation layer 70 to be connected to the first driving electrode pattern 10 and the second driving electrode pattern 20.

Figure 5:
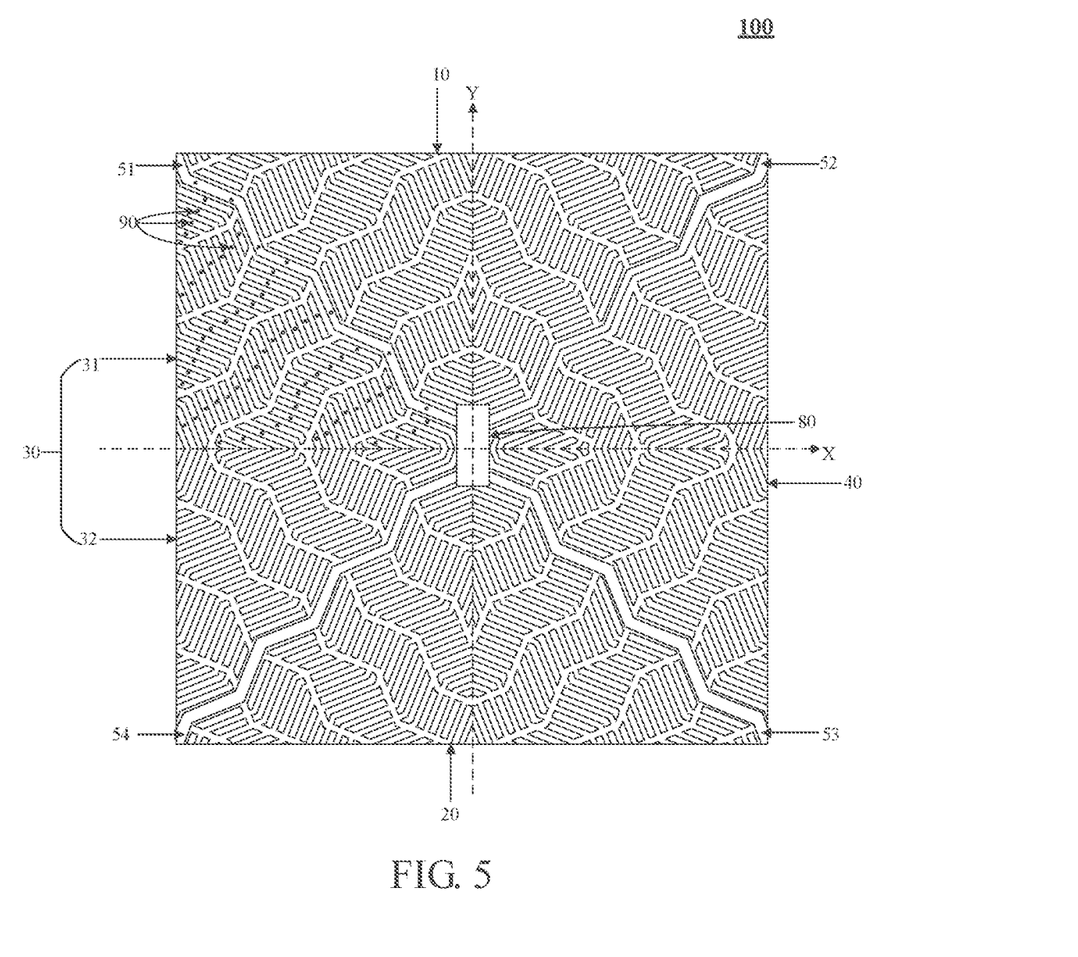
FIG. 5 shows a schematic view of a fifth structure of a touch substrate according to one embodiment of the present disclosure.

Please refer to FIG. 5. In some embodiments, a plurality of dummy electrodes 90 can be disposed in the insulation recesses of the first driving electrode pattern 10, the second driving electrode pattern 20, the first sensing electrode pattern 30, and the second sensing electrode pattern 40. In addition, a plurality of dummy electrodes 90 can be disposed in the first insulation trench 51, the second insulation trench 52, the third insulation trench 53, and the fourth insulation trench 54.

It is understood that, in FIG. 5, only the dummy electrodes 90 in the first sub-sensing electrode pattern 31 and the first insulation trench 51 are shown. Nevertheless, the dummy electrodes 90 can be disposed in the first driving electrode pattern 10, the second driving electrode pattern 20, the second sub-sensing electrode pattern 32, the second sensing electrode pattern 40, the second insulation trench 52, the third insulation trench 53, and the fourth insulation trench 54 in the same way.

The dummy electrodes 90 are suspended without being connected to the electrode pattern. The dummy electrodes 90 are used to adjust distances among the first driving electrode pattern 10, the second driving electrode pattern 20, the first sensing electrode pattern 30, and the second sensing electrode pattern 40, such that the mutual capacitances among the first driving electrode pattern 10, the second driving electrode pattern 20, the first sensing electrode pattern 30, and the second sensing electrode pattern 40 can be modified. In addition, the dummy electrodes 90 are used to make the insulation recesses of the first driving electrode pattern 10, the second driving electrode pattern 20, the first sensing electrode pattern 30, and the second sensing electrode pattern 40 as well as the first insulation trench 51, the second insulation trench 52, the third insulation trench 53, and the fourth insulation trench 54 to have the same light reflectance and light transmittance as that in the non-etched regions. Therefore, the likelihood that the electrode patterns are visually noticeable is lowered.

In some embodiments, the touch substrate 100 is disposed on a flexible substrate 60. A lot of metal lead lines are formed at periphery of the touch substrate 100. The metal lead lines are connected to the flexible substrate 60.

According to the touch substrate provided by the embodiments of the present disclosure, the shapes of the inside of the electrode patterns are formed to be in consistency with the shapes of the outer peripheries of the electrode patterns, therefore difference of light reflectance between the trenches surrounding the electrode patterns and the inside of the electrode patterns is reduced. Accordingly, the likelihood that the electrode patterns are visually noticeable is lowered, thus raising the visual effects displayed by the display devices.

In addition, the present disclosure provides a display device. The display device includes a touch substrate, as described in the above embodiments. Please refer to the above embodiments for details of the touch substrate, and description thereof is thus omitted. It is understood that the display device can include any one of the touch substrates described in the above embodiments.

In the foregoing embodiments, the description of each of the embodiments has respective focuses. For a part that is not described in detail in a certain embodiment, reference may be made to related descriptions in other embodiments.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A touch substrate, comprising: a first driving electrode pattern, a second driving electrode pattern, a first sensing electrode pattern, a second sensing electrode pattern, a first insulation trench, a second insulation trench, a third insulation trench, and a fourth insulation trench;

wherein the first sensing electrode pattern and the second sensing electrode pattern are connected to each other via a connection portion, and the first driving electrode pattern and the second driving electrode pattern are disposed at two sides of the connection portion;

wherein the first insulation trench is connected to the second insulation trench, such that the first driving electrode pattern is separated from the first sensing electrode pattern and the second sensing electrode pattern;

wherein the third insulation trench is connected to the fourth insulation trench, such that the second driving electrode pattern is separated from the first sensing electrode pattern and the second sensing electrode pattern;

wherein the first insulation trench comprises a plurality of trenches having a first slope and a plurality of trenches having a second slope;

wherein the second insulation trench comprises a plurality of trenches having a third slope and a plurality of trenches having a fourth slope;

wherein the third insulation trench comprises a plurality of trenches having a fifth slope and a plurality of trenches having a sixth slope;

wherein the fourth insulation trench comprises a plurality of trenches having a seventh slope and a plurality of trenches having an eighth slope.

2. The touch substrate according to claim 1, wherein
the trenches having the first slope and the trenches having the second slope are connected to each other alternately;
the trenches having the third slope and the trenches having the fourth slope are connected to each other alternately;
the trenches having the fifth slope and the trenches having the sixth slope are connected to each other alternately;
the trenches having the seventh slope and the trenches having the eighth slope are connected to each other alternately.

3. The touch substrate according to claim 2, wherein
the first insulation trench is symmetrical to the second insulation trench with respect to a Y-axis;
the third insulation trench is symmetrical to the fourth insulation trench with respect to the Y-axis.

4. The touch substrate according to claim 3, wherein
the first driving electrode pattern comprises a first sub-driving electrode pattern and a second sub-driving electrode pattern;
the first sub-driving electrode pattern comprises a plurality of first driving electrode lines and a plurality of second driving electrode lines;
each of the first driving electrode lines comprises a plurality of electrode lines having the first slope and a plurality of electrode lines having the second slope, and the electrode lines having the first slope and the electrode lines having the second slope are connected to each other alternately;
each of the second driving electrode lines comprises a plurality of electrode lines having the third slope and a plurality of electrode lines having the fourth slope, and the electrode lines having the third slope and the electrode lines having the fourth slope are connected to each other alternately;
the first driving electrode lines and the second driving electrode lines cross each other;
the second sub-driving electrode pattern and the first sub-driving electrode pattern are axisymmetrical to each other.

5. The touch substrate according to claim 3, wherein
the second driving electrode pattern comprises a third sub-driving electrode pattern and a fourth sub-driving electrode pattern;
the third sub-driving electrode pattern comprises a plurality of third driving electrode lines and a plurality of fourth driving electrode lines;
each of the third driving electrode lines comprises a plurality of electrode lines having the fifth slope and a plurality of electrode lines having the sixth slope, and the electrode lines having the fifth slope and the electrode lines having the sixth slope are connected to each other alternately;
each of the fourth driving electrode lines comprises a plurality of electrode lines having the seventh slope and a plurality of electrode lines having the eighth slope, and the electrode lines having the seventh slope and the electrode lines having the eighth slope are connected to each other alternately;
the third driving electrode lines and the fourth driving electrode lines cross each other;
the fourth sub-driving electrode pattern and the third sub-driving electrode pattern are axisymmetrical to each other.

6. The touch substrate according to claim 3, wherein
the first sensing electrode pattern comprises a first sub-sensing electrode pattern and a second sub-sensing electrode pattern;
the first sub-sensing electrode pattern comprises a plurality of first sensing electrode lines and a plurality of second sensing electrode lines;
each of the first sensing electrode lines comprises a plurality of electrode lines having the first slope and a plurality of electrode lines having the second slope, and the electrode lines having the first slope and the electrode lines having the second slope are connected to each other alternately;
each of the second sensing electrode lines comprises a plurality of electrode lines having the seventh slope and a plurality of electrode lines having the eighth slope, and the electrode lines having the seventh slope and the electrode lines having the eighth slope are connected to each other alternately;
the first sensing electrode lines and the second sensing electrode lines cross each other;
the second sub-sensing electrode pattern and the first sub-sensing electrode pattern are axisymmetrical to each other.

7. The touch substrate according to claim 6, wherein
the second sensing electrode pattern further comprises a third sub-sensing electrode pattern and a fourth sub-sensing electrode pattern;
the third sub-sensing electrode pattern comprises a plurality of third sensing electrode lines and a plurality of fourth sensing electrode lines;
each of the third sensing electrode lines comprises a plurality of electrode lines having the third slope and a plurality of electrode lines having the fourth slope, and the electrode lines having the third slope and the electrode lines having the fourth slope are connected to each other alternately;
each of the fourth sensing electrode lines comprises a plurality of electrode lines having the fifth slope and a plurality of electrode lines having the sixth slope, and the electrode lines having the fifth slope and the electrode lines having the sixth slope are connected to each other alternately;

the third sensing electrode lines and the fourth sensing electrode lines cross each other;

the fourth sub-sensing electrode pattern and the third sub-sensing electrode pattern are axisymmetrical to each other.

8. The touch substrate according to claim 7, further comprising:
an insulation layer covering the first driving electrode pattern, the second driving electrode pattern, the first sensing electrode pattern, and the second sensing electrode pattern.

9. The touch substrate according to claim 1, further comprising:
a connection bridge disposed on the insulation layer, wherein the connection bridge is disposed between the first driving electrode pattern and the second driving electrode pattern to electrically connect the first driving electrode pattern to the second driving electrode pattern.

10. A display device, comprising: a first driving electrode pattern, a second driving electrode pattern, a first sensing electrode pattern, a second sensing electrode pattern, a first insulation trench, a second insulation trench, a third insulation trench, and a fourth insulation trench;
wherein the first sensing electrode pattern and the second sensing electrode pattern are connected to each other via a connection portion, and the first driving electrode pattern and the second driving electrode pattern are disposed at two sides of the connection portion;
wherein the first insulation trench is connected to the second insulation trench, such that the first driving electrode pattern is separated from the first sensing electrode pattern and the second sensing electrode pattern;
wherein the third insulation trench is connected to the fourth insulation trench, such that the second driving electrode pattern is separated from the first sensing electrode pattern and the second sensing electrode pattern;
wherein the first insulation trench comprises a plurality of trenches having a first slope and a plurality of trenches having a second slope;
wherein the second insulation trench comprises a plurality of trenches having a third slope and a plurality of trenches having a fourth slope;
wherein the third insulation trench comprises a plurality of trenches having a fifth slope and a plurality of trenches having a sixth slope;
wherein the fourth insulation trench comprises a plurality of trenches having a seventh slope and a plurality of trenches having an eighth slope.

11. The display device according to claim 10, wherein
the trenches having the first slope and the trenches having the second slope are connected to each other alternately;
the trenches having the third slope and the trenches having the fourth slope are connected to each other alternately;
the trenches having the fifth slope and the trenches having the sixth slope are connected to each other alternately;
the trenches having the seventh slope and the trenches having the eighth slope are connected to each other alternately.

12. The display device according to claim 11, wherein
the first insulation trench is symmetrical to the second insulation trench with respect to a Y-axis;
the third insulation trench is symmetrical to the fourth insulation trench with respect to the Y-axis.

13. The display device according to claim 12, wherein
the first driving electrode pattern comprises a first sub-driving electrode pattern and a second sub-driving electrode pattern;
the first sub-driving electrode pattern comprises a plurality of first driving electrode lines and a plurality of second driving electrode lines;
each of the first driving electrode lines comprises a plurality of electrode lines having the first slope and a plurality of electrode lines having the second slope, and the electrode lines having the first slope and the electrode lines having the second slope are connected to each other alternately;
each of the second driving electrode lines comprises a plurality of electrode lines having the third slope and a plurality of electrode lines having the fourth slope, and the electrode lines having the third slope and the electrode lines having the fourth slope are connected to each other alternately;
the first driving electrode lines and the second driving electrode lines cross each other;
the second sub-driving electrode pattern and the first sub-driving electrode pattern are axisymmetrical to each other.

14. The display device according to claim 12, wherein
the second driving electrode pattern comprises a third sub-driving electrode pattern and a fourth sub-driving electrode pattern;
the third sub-driving electrode pattern comprises a plurality of third driving electrode lines and a plurality of fourth driving electrode lines;
each of the third driving electrode lines comprises a plurality of electrode lines having the fifth slope and a plurality of electrode lines having the sixth slope, and the electrode lines having the fifth slope and the electrode lines having the sixth slope are connected to each other alternately;
each of the fourth driving electrode lines comprises a plurality of electrode lines having the seventh slope and a plurality of electrode lines having the eighth slope, and the electrode lines having the seventh slope and the electrode lines having the eighth slope are connected to each other alternately;
the third driving electrode lines and the fourth driving electrode lines cross each other;
the fourth sub-driving electrode pattern and the third sub-driving electrode pattern are axisymmetrical to each other.

15. The display device according to claim 14, wherein
the second sensing electrode pattern further comprises a third sub-sensing electrode pattern and a fourth sub-sensing electrode pattern;
the third sub-sensing electrode pattern comprises a plurality of third sensing electrode lines and a plurality of fourth sensing electrode lines;
each of the third sensing electrode lines comprises a plurality of electrode lines having the third slope and a plurality of electrode lines having the fourth slope, and the electrode lines having the third slope and the electrode lines having the fourth slope are connected to each other alternately;
each of the fourth sensing electrode lines comprises a plurality of electrode lines having the fifth slope and a plurality of electrode lines having the sixth slope, and the electrode lines having the fifth slope and the electrode lines having the sixth slope are connected to each other alternately;

the third sensing electrode lines and the fourth sensing electrode lines cross each other;

the fourth sub-sensing electrode pattern and the third sub-sensing electrode pattern are axisymmetrical to each other.

16. The display device according to claim 15, further comprising:

an insulation layer covering the first driving electrode pattern, the second driving electrode pattern, the first sensing electrode pattern, and the second sensing electrode pattern.

17. The display device according to claim 10, further comprising:

a connection bridge disposed on the insulation layer, wherein the connection bridge is disposed between the first driving electrode pattern and the second driving electrode pattern to electrically connect the first driving electrode pattern to the second driving electrode pattern.

\* \* \* \* \*